United States Patent
Caraan et al.

(10) Patent No.: US 11,405,559 B1
(45) Date of Patent: Aug. 2, 2022

(54) SYSTEMS AND METHODS FOR LIVE SIGNAL ADJUSTMENT OF A MOVABLE CAMERA

(71) Applicant: Honda Motor Co., Ltd., Tokyo (JP)

(72) Inventors: Oscar A. Caraan, Delaware, OH (US); Troy A. Thompson, Delaware, OH (US); Jacob A. Rothschild, Lake Forest, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/180,683

(22) Filed: Feb. 19, 2021

(51) Int. Cl.
*H04N 5/232* (2006.01)
*G06T 7/13* (2017.01)

(52) U.S. Cl.
CPC ........... *H04N 5/23296* (2013.01); *G06T 7/13* (2017.01); *H04N 5/23299* (2018.08); *G06T 2207/20132* (2013.01)

(58) Field of Classification Search
CPC .. H04N 5/23296; H04N 5/23299; G06T 7/13; G06T 2207/20132
See application file for complete search history.

(56) References Cited

U.S. PATENT DOCUMENTS

| | | | |
|---|---|---|---|
| 6,130,705 A | 10/2000 | Lareau et al. |
| 7,049,780 B2 | 5/2006 | Chang |
| 7,688,221 B2 | 3/2010 | Watanabe et al. |
| 8,035,495 B2 | 10/2011 | Oh et al. |
| 8,035,575 B2 | 10/2011 | Okabe et al. |
| 8,340,870 B2 | 12/2012 | Ohshima et al. |
| 8,370,030 B1 | 2/2013 | Gurin |
| 8,670,035 B2 | 3/2014 | Robert |
| 8,717,196 B2 | 5/2014 | Wang et al. |
| 9,156,496 B2 | 10/2015 | Greenwood et al. |
| 9,193,303 B2 | 11/2015 | Higgins-Luthman |
| 9,205,776 B2 | 12/2015 | Turk |
| 9,491,451 B2 | 11/2016 | Pliefke |

(Continued)

FOREIGN PATENT DOCUMENTS

| | | |
|---|---|---|
| CN | 107662544 | 2/2018 |
| CN | 108515912 | 9/2018 |

(Continued)

*Primary Examiner* — Christopher K Peterson
(74) *Attorney, Agent, or Firm* — Rankin, Hill & Clark LLP

(57) ABSTRACT

System and methods for live signal adjustment of a moveable camera are provided. In one embodiment, a method includes receiving a raw image associated with the moveable camera associated with a vehicle mirror. The method includes receiving a rotation input to change a position of a reflective surface of the vehicle mirror. The method includes identifying a first component of the second position of the reflective surface based on a first component sensor. The method includes identifying a second component of the second position of the reflective surface based on a second component sensor. The method includes determining cropping parameters based on a shape of the reflective surface, the first component, and the second component. The method includes generating an adjusted cropped image by cropping the raw image based on the cropping parameters. The method includes displaying the adjusted cropped image on a display in response to the rotation input.

20 Claims, 5 Drawing Sheets

(56) References Cited

U.S. PATENT DOCUMENTS

| | | |
|---|---|---|
| 9,563,951 B2 | 2/2017 | Okouneva |
| 9,725,039 B2 | 8/2017 | Matsukawa et al. |
| 9,725,048 B2 | 8/2017 | Heinemann |
| 9,756,291 B2 | 9/2017 | Han |
| 9,802,538 B2 | 10/2017 | Augst |
| 9,834,153 B2 | 12/2017 | Gupta et al. |
| 9,916,660 B2 | 3/2018 | Singh et al. |
| 9,986,173 B2 | 5/2018 | Wang et al. |
| 10,179,543 B2 | 1/2019 | Rathi et al. |
| 10,438,374 B2 | 10/2019 | Dreuw et al. |
| 2003/0103142 A1 | 6/2003 | Hitomi et al. |
| 2006/0066967 A1* | 3/2006 | Yamada .................. B60R 1/072 359/874 |
| 2007/0263301 A1 | 11/2007 | Agrest |
| 2008/0074768 A1 | 3/2008 | Yang |
| 2010/0220406 A1 | 9/2010 | Cuddihy et al. |
| 2011/0181728 A1 | 7/2011 | Tieman et al. |
| 2013/0033604 A1 | 2/2013 | Ohshima et al. |
| 2014/0240500 A1 | 8/2014 | Davies |
| 2015/0042797 A1 | 2/2015 | Alam et al. |
| 2015/0049193 A1 | 2/2015 | Gupta et al. |
| 2015/0085117 A1 | 3/2015 | Chang |
| 2016/0137126 A1 | 5/2016 | Fürsich et al. |
| 2016/0263997 A1 | 9/2016 | Mizutani |
| 2017/0371156 A1* | 12/2017 | Heishi ...................... H04N 7/18 |
| 2018/0056875 A1 | 3/2018 | Goncalves et al. |
| 2018/0164831 A1 | 6/2018 | Han et al. |
| 2019/0098226 A1 | 3/2019 | Kulkarni et al. |
| 2019/0135191 A1* | 5/2019 | Sunagawa ............... B60R 11/02 |

FOREIGN PATENT DOCUMENTS

| | | |
|---|---|---|
| CN | 109109749 | 1/2019 |
| DE | 102017210415 | 12/2018 |
| KR | 101486670 | 1/2015 |
| WO | WO2014/159868 | 10/2014 |
| WO | WO2016/064361 | 4/2016 |
| WO | WO2017025681 | 2/2017 |
| WO | WO2019040711 | 2/2019 |

* cited by examiner

SYSTEMS AND METHODS FOR LIVE SIGNAL ADJUSTMENT OF A MOVABLE CAMERA

BACKGROUND

Most modern vehicles have vehicle mirrors that allow a user within the vehicle to visualize a rear view or side view of the exterior environment of the vehicle. For example, a side mounted mirror may be mounted on the on the doors, normally at the A-pillar, or at the wings (the portion of the vehicle body above the wheel well). Side mounted mirrors are typically equipped for manual or remote vertical and horizontal adjustment so as to provide adequate coverage to users of differing heights and seated positions. Remote adjustment may be mechanical by means of bowden cables, or may be electric by means of geared motors.

BRIEF DESCRIPTION

According to one embodiment, a system for live signal adjustment of a moveable camera is provided. The system includes an image module, a rotation module, a crop module, and a display module. The image module is configured to receive a raw image associated with the moveable camera associated with a vehicle mirror. The rotation module is configured to receive a rotation input to change a position of a reflective surface of the vehicle mirror from a first position to a second position. The rotation module is also configured to identify a first component of the second position of the reflective surface based on a first component sensor. The rotation module is further configured to identify a second component of the second position of the reflective surface based on a second component sensor. The crop module is configured to determine cropping parameters based on a shape of the reflective surface, the first component, and the second component. The crop module is further configured generate an adjusted cropped image by cropping the raw image based on the cropping parameters. The display module is configured to display the adjusted cropped image on a display in response to the rotation input.

According to another embodiment, a method for live signal adjustment of a moveable side-mounted mirror camera is provided. The method includes receiving a raw image associated with the moveable camera associated with a vehicle mirror. The method also includes receiving a rotation input to change a position of a reflective surface of the vehicle mirror from a first position to a second position. The method includes identifying a first component of the second position of the reflective surface based on a first component sensor. The method further includes identifying a second component of the second position of the reflective surface based on a second component sensor. The method also includes determining cropping parameters based on a shape of the reflective surface, the first component, and the second component. The method then includes generating an adjusted cropped image by cropping the raw image based on the cropping parameters. The method includes displaying the adjusted cropped image on a display in response to the rotation input.

According to yet another embodiment, a non-transitory computer readable storage medium storing instructions that, when executed by a computer having a processor, cause the computer to perform a method for live signal adjustment of a moveable side-mounted mirror camera is provided. The method includes receiving a raw image associated with the moveable camera associated with a vehicle mirror. The method also includes receiving a rotation input to change a position of a reflective surface of the vehicle mirror from a first position to a second position. The method includes identifying a first component of the second position of the reflective surface based on a first component sensor. The method further includes identifying a second component of the second position of the reflective surface based on a second component sensor. The method also includes determining cropping parameters based on a shape of the reflective surface, the first component, and the second component. The method then includes generating an adjusted cropped image by cropping the raw image based on the cropping parameters. The method includes displaying the adjusted cropped image on a display in response to the rotation input.

DETAILED DESCRIPTION

Figure 1:
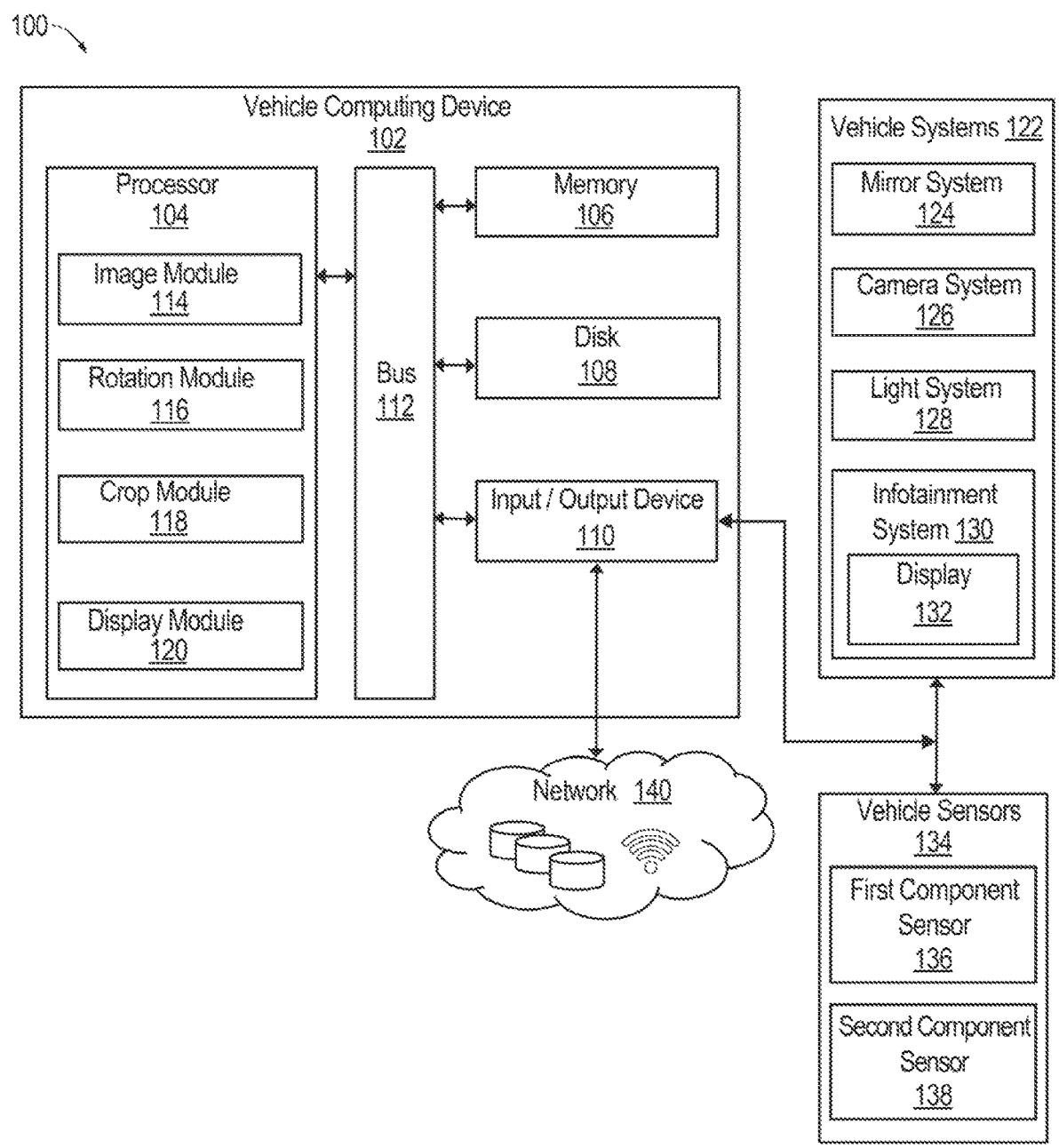
FIG. 1 is a schematic view of an operating environment for live signal adjustment of a moveable camera according to an exemplary embodiment.

The systems and methods herein provide live signal adjustment of a moveable camera. As discussed above, many modern vehicles have moveable vehicle mirrors that allow a user to visualize the exterior environment of the vehicle. Vehicles may also include multiple cameras for different reasons, such as rearview backup camera, bird's eye view cameras, or lane watch cameras. In general, these cameras collect a wide view images. Here, a vehicle computing device (VCD) may crop the view image to a portion of the image such that the location and orientation are stable and predictable to the user. In particular, the VCD crops the signal down to the portion that should be displayed to the user.

The displayed cropped image may be calculated as the moveable camera is moved with the vehicle mirror. In particular, the moveable camera is mounted to a component or housing that might move or rotate. The signal adjustment compensates for that movement. The signal adjustment is live to provide the user with up-to-date information about the environment exterior to the vehicle so that the user does not experience a significant delay to the images.

In one embodiment, the position of the reflective surface of the vehicle mirror is sensed, for example, by using a variable resistor. For example, the variable resistor may take the input voltage from the vehicle and outputs a different voltage based on the position of the reflective surface. Further, the position of the reflective surface may then be correlated to the position of the moveable camera. In some embodiments the moveable camera and the reflective surface of the vehicle mirror may be directly attached, for example, via the housing. In another embodiment, the moveable camera is located remotely from the vehicle mirror. In either embodiment, the position of the moveable camera is separated by a separation distance from the rotational center reflective surface. The position and orientation of the moveable camera can be calculated from the voltage signal mathematically based on the separation distance.

The moveable camera will crop the raw camera image and the cropped image will be displayed to the user. The raw image of the moveable camera is cropped based on the the position of the reflective surface of the vehicle mirror given by, for example, the output voltages of the variable resistor. Accordingly, the systems and methods described herein account for the complex motion of the camera location and orientation as a function of rotation of the reflective surface of the vehicle mirror.

Definitions

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to: display devices, and other devices for outputting information and functions.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle display" or "display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Over View

Referring now to the drawings, the drawings are for purposes of illustrating one or more exemplary embodiments and not for purposes of limiting the same. FIG. 1 is an exemplary component diagram of an operating environment 100 for live signal adjustment of a moveable camera, according to one aspect. The components of operating environment 100, as well as the components of other systems, hardware architectures, and software architectures discussed herein, may be combined, omitted, or organized into different architectures for various embodiments.

In the illustrated embodiment of FIG. 1, the operating environment 100 includes a vehicle computing device (VCD) 102 with provisions for processing, communicating and interacting with various components of the host vehicle 200 and other components of the operating environment 100. In one embodiment, the VCD 102 can be implemented with the example host vehicle 200, for example, as part of a telematics unit, a head unit, a navigation unit, an infotainment unit, an electronic control unit, among others. In other embodiments, the components and functions of the VCD 102 can be implemented remotely from the example host vehicle 200, for example, with a portable device (not shown) or another device connected via a network (e.g., a network 140).

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 includes an image module 114, a rotation module 116, a crop module 118, and a display module 120, for live signal adjustment of a moveable camera associated with a vehicle mirror, facilitated by the components of the operating environment 100.

The VCD 102 is also operably connected for computer communication (e.g., via the bus 112 and/or the I/O interface 110) to one or more vehicle systems 122. The vehicle systems 122 can include, but are not limited to, any automatic or manual systems that can be used to enhance the vehicle, driving, and/or safety. Here, the vehicle systems 122 include a mirror system 124, a camera system 126, a light system 128, and an infotainment system 130 according to an exemplary embodiment. The mirror system 124 controls the vehicle mirrors of the host vehicle 200 including mirror parameters such as the angle relative to the host vehicle 200, the tilt, anti-fog, status, etc. The camera system 126 controls the cameras of the host vehicle 200 including camera parameters such as focal length, zoom, camera angle, etc. The light system 128 controls the lights of the vehicle to actuate, including, for example, exterior lights (e.g., turn signal lights) and/or interior lights such as the dashboard lights. The infotainment system 130 provides visual information, including from the mirror system 124 and the camera system 126, and/or entertainment and can include a display 132.

The vehicle systems 122 include and/or are operably connected for computer communication to various vehicle sensors 134. The vehicle sensors 134 provide and/or sense information associated with the vehicle, the vehicle environment, and/or the vehicle systems 122. The vehicle sensors 134 can include, but are not limited to, a first component sensor 136 and a second component sensor 138 associated with the vehicle systems 122, other vehicle sensors associated with the example host vehicle 200, devices of the host vehicle 200, or the environment of the host vehicle 200.

Figure 2:
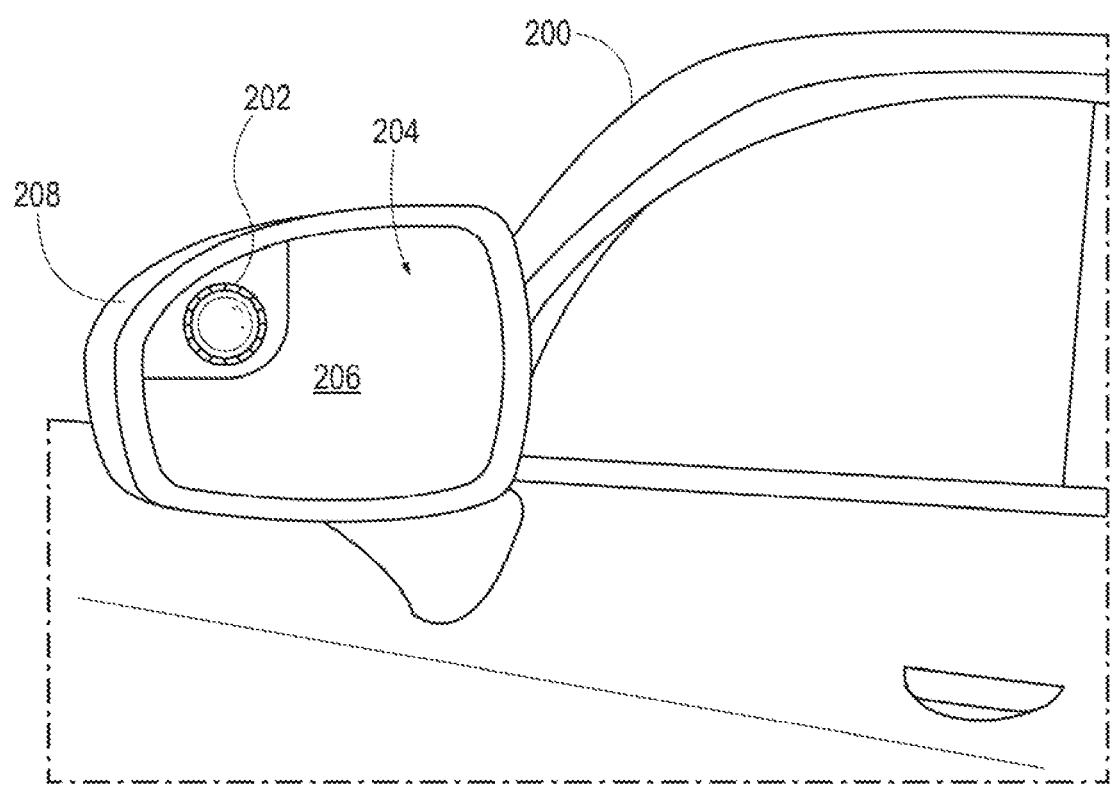
FIG. 2 is an illustrative example of a moveable camera associated with a vehicle mirror according to an exemplary embodiment.

The first component sensor 136 and the second component sensor 138 can include, but are not limited to, environmental sensors, vehicle speed sensors, accelerator pedal sensors, brake sensors, throttle position sensors, wheel sensors, anti-lock brake sensors, camshaft sensors, image sensors, such as cameras, optical sensors, radio sensors, among others. In some embodiments, the first component sensor 136 and the second component sensor 138 may be incorporated with the vehicle systems 122. For example, turning to FIG. 2, the host vehicle 200 may include a moveable camera 202 and a vehicle mirror 204 having a reflective surface 206 seated in a housing 208.

The moveable camera 202 may be a front view camera, such as a dash camera, a side view camera, such as a camera mounted on a side view mirror, a back-up camera, etc. The moveable camera 202 may move relative to the vehicle mirror 204. For example, by moving the rearview mirror the focus of a back-up camera may move in comparison. In the example shown in FIG. 2, the moveable camera 202 shares a housing 208 with the vehicle mirror 204, which is a side view mirror. Accordingly, the moveable camera 202 may move as the vehicle mirror 204 is adjusted.

In one embodiment, as a user (not shown) adjusts the reflective surface 206 for rear view visibility, the housing 208 will rotate with the reflective surface 206 thereby also moving the moveable camera 202. The reflective surface 206 reflects an image of the exterior environment of the host vehicle 200 to the user, and may be a plate of transparent glass, with a thin reflective layer. The reflective layer of the reflective surface 206 may be comprised of silver, tin, nickel, or chromium. The reflective surface 206 of the vehicle mirror 204 may change position using a mechanical component (not shown) such a reflective surface actuator. The housing 208 may directly or indirectly attach The first component sensor 136 and the second component sensor 138 may be incorporated with the mirror system 124 as a portion of the reflective surface actuator that is capable of tilting, angling, and/or rotating the moveable camera 202, the reflective surface 206 and/or the housing 208. Accordingly, first component sensor 136 and the second component sensor 138 may detect characteristics of the moveable camera 202, the reflective surface 206 and/or the housing 208, such as position. For example, the structure connecting each of the moveable camera 202 and the vehicle mirror 204 to the housing 208 causes either of the moveable camera 202 and the vehicle mirror 204 when the other moves.

In this manner, the first component sensor 136 and the second component sensor 138 may detect characteristics of the one or more characteristics of the devices of the host vehicle 200, such as the position and/or rotations of the moveable camera 202, the reflective surface 206 and/or the housing 208 which can be communicated with the VCD 102. Accordingly, the vehicle sensors 134 are operable to sense a measurement of data associated with the host vehicle 200, the vehicle environment, and/or the vehicle systems 122, and generate a data signal indicating said measurement of data. These data signals can be converted into other data formats (e.g., numerical) and/or used by the vehicle systems 122 and/or the VCD 102 to generate other data metrics and parameters. The sensors can be any type of sensor, for example, acoustic, electric, environmental, optical, imaging, light, pressure, force, thermal, temperature, proximity, among others.

The VCD 102 is also operatively connected for computer communication to the network 140. The connection from the I/O interface 110 to the network 140, can be facilitated in various ways. For example, through a network connection (e.g., wired or wireless), a cellular data network from a portable device (not shown), a vehicle to vehicle ad-hoc network (not shown), an in-vehicle network (not shown), among others, or any combination of thereof. The network 140 is, for example, a data network, the Internet, a wide area network or a local area network. The network 140 serves as a communication medium to various remote devices (e.g., databases, web servers, remote servers, application servers, intermediary servers, client machines, other portable devices).

Application of Systems and Methods

The application of systems and methods are described with respect to the host vehicle 200. The host vehicle 200 is a vehicle having the operating environment 100 described above. The examples described herein will be described with respect to a side-mounted mirror, however, the systems and methods may be applied to other types of mirror and camera combinations.

Figure 3:
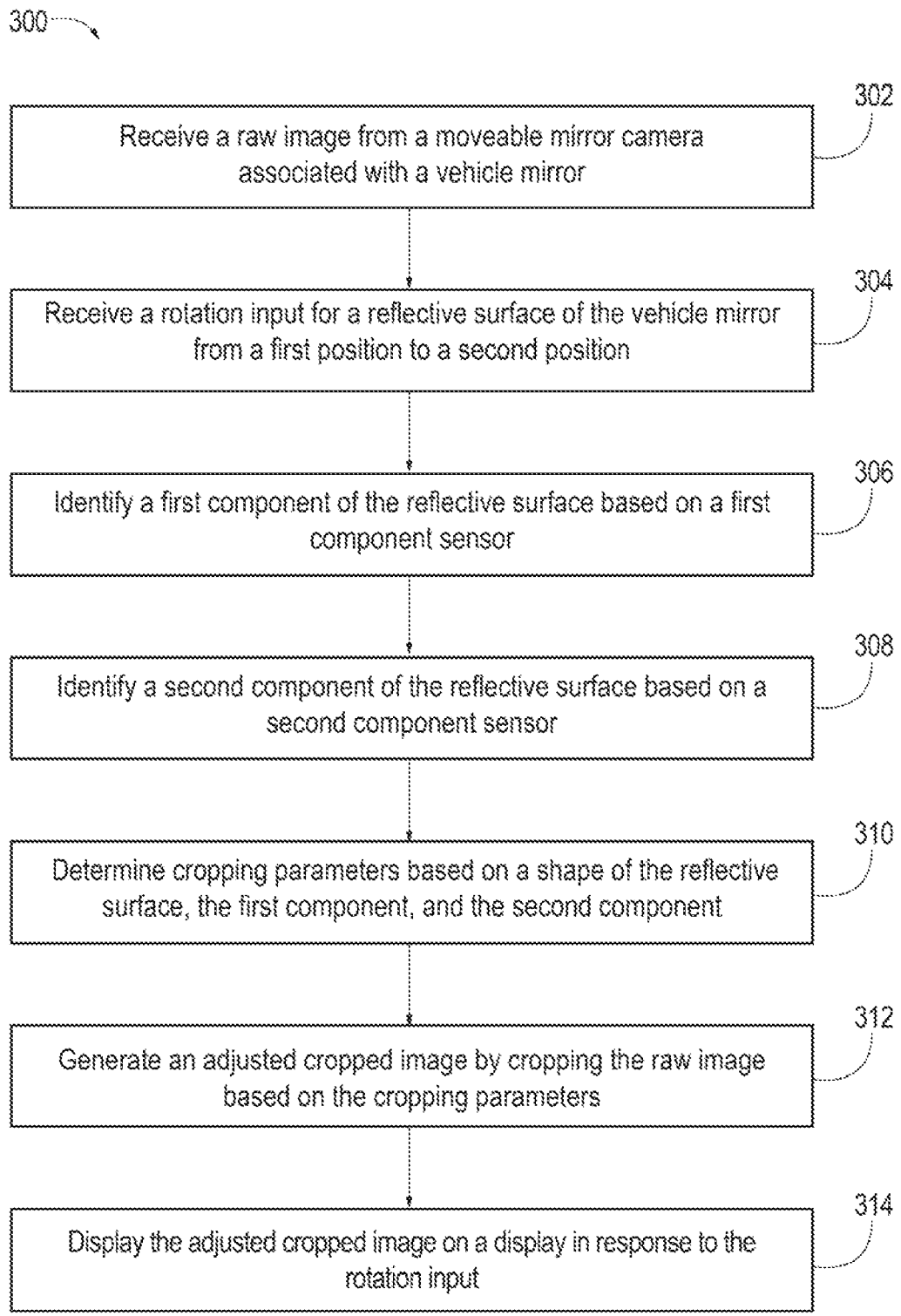
FIG. 3 is a process flow diagram of a method for live signal adjustment of a moveable camera according to an exemplary embodiment.

Referring now to FIG. 3, a method 300 or live signal adjustment of a moveable camera 202 will now be described according to an exemplary embodiment. FIG. 3 will also be described with reference to FIGS. 1, 2, 4A and 4B. For simplicity, the method 300 will be described as a sequence of elements, but it is understood that the elements of the method 300 may be organized into different architectures, blocks, stages, and/or processes.

Figure 4B:
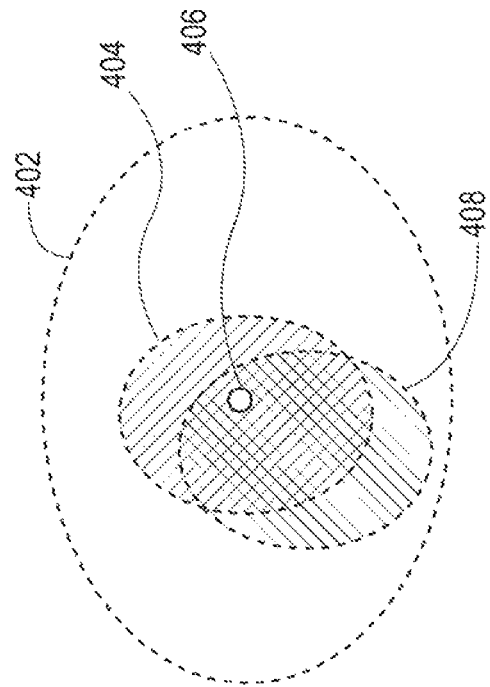
FIG. 4B is an illustrative example of an adjusted view area of a moveable camera according to an exemplary embodiment.
Figure 4A:
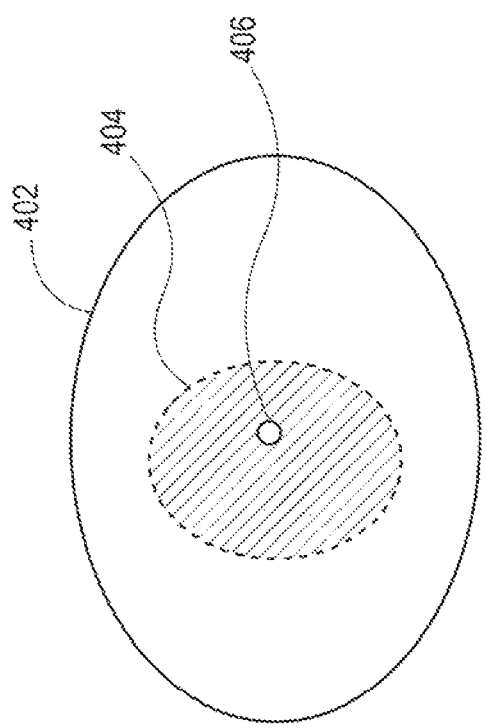
FIG. 4A is an illustrative example of a nominal view area of a moveable camera according to an exemplary embodiment.

At block 302, the method 300 includes the image module 114 receiving a raw image associated with the moveable camera 202 associated with a vehicle mirror 204. The raw image is a visual depiction of the environment of the host vehicle 200. Turning to FIGS. 4A and 4B, the raw image may depict the total camera view area 402 of the environment of the host vehicle 200 that the moveable camera 202 can capture. The raw image may not have been processed or processed in to achieve specific effects. For example, the light intensity and color of the total camera view area 402 may be altered based on the specifications of the moveable camera 202 and/or the camera system 126. In some embodiment, the raw image may be a wide view image of the exterior environment of the host vehicle 200.

At block 304, the method 300 includes the rotation module 116 receiving a rotation input to change a position of the reflective surface 206 of the vehicle mirror 204 from a first position to a second position. Suppose that the first position is associated with the first cropped area 404 shown in FIG. 4A. In the first position, the reflective surface 206 is aligned with the camera axis location 406 of the moveable camera 202 such that the first cropped area 404 of the total camera view area 402 corresponds to what a user would see in the reflective surface 206.

However, if the rotation module 116 receives rotation input from a user to adjust the first position of the reflective surface 206, the housing 208 may also rotate, thereby causing the moveable camera 202 to rotate with the reflective surface 206 to the second position. Accordingly, the moveable camera 202 will rotate and the image displayed on the display 132 will also move if no compensation is made. In this manner, moving the vehicle mirror 204 may have unintended consequences for the first cropped area 404 which can affect the functionality of the host vehicle 200. Autonomous driving and/or parking features may be dependent on the orientation between the first cropped area 404 and the host vehicle 200. For example, suppose that the second position is associated with the second cropped area 408 shown in FIG. 4B relative to the camera axis location 406. The camera axis location is different for the first position and the second position as shown in FIG. 4B based on the different location of the camera axis location 406 in the first cropped view area 404 as opposed to the second cropped area 408. The amount of the difference may be based on a separation distance measured between the moveable camera 202 and the vehicle mirror 204.

The rotation input may be received from mirror system 124 as a user input to angle or rotate the vehicle mirror 204 to the left or right by a certain number of increments from the first position to the second position. Similarly, the rotation input may be received from the mirror system 124 to move the vehicle mirror 204 up or down by a certain number of increments from the first position to the second position. The rotation input may also include an input to angle, tilt, or rotate the vehicle mirror 204 from the first position to the second position. As discussed above, the movement from the first position to the second position may also effect other devices associated with the vehicle mirror 204 such as the moveable camera 202 if, for example, the moveable camera 202 shares the same controls or the housing 208.

At block 306, the method 300 includes the crop module 118 identifying a first component of the second position of the reflective surface 206 based on a first component sensor 136. As discussed above, the first component sensor 136 measures the position of the reflective surface 206 of the vehicle mirror 204. In one embodiment, the first component sensor 136 is a variable resistor, as the reflective surface 206 rotates, a first voltage signal received by the first component sensor 136 changes. Accordingly, the first component sensor 136 may receive an input voltage from the host vehicle 200 associated with the first position and output a different voltage as the first voltage value based on the second position of the reflective surface 206 as the reflective surface 206 moves or when the reflective surface 206 is positioned in the second position. In this manner, the crop module 118 may determine a first component of the orientation of the second position based on the output voltage.

At block 308, the method 300 includes the crop module 118 identifying a second component of the second position of the reflective surface 206 based on a second component sensor 138. Like the first component sensor 136, the second component sensor 138 may be a variable resistor, and as the reflective surface 206 rotates, a second voltage signal received by the second component sensor 138 changes. Accordingly, the second component sensor 138 may receive an input voltage from the host vehicle 200 associated with the first position and output a different voltage as the second voltage value based on the second position of the reflective surface 206 as the reflective surface 206 moves or when the reflective surface 206 is positioned in the second position. Accordingly, the crop module 118 may determine a second component of the orientation of the second position based on the output voltage.

The first voltage signal may correspond to a first degree of freedom of the reflective surface 206, such as left or right. While the second voltage signal may correspond a second degree of freedom of the reflective surface 206, such as up and down. In this manner, the number of identified components may correspond to the number of orientation sensors and degrees of freedom. For example, the first component sensor 136 may be a horizontal component sensor that measure the horizontal orientation of the reflective surface 206. Likewise, the second component sensor 138 may be a vertical component sensor that measures the vertical orientation of the reflective surface 206.

At block 310, the method 300 includes determining the cropping parameters based on a shape of the reflective surface 206, the first component, and the second component. The cropping parameters define an area of the exterior environment of the host vehicle 200 to include in the cropped image. For example, the cropping parameters may include a camera axis adjustment for the camera axis location 406 from a first camera axis associated with the first position to a second camera axis associated with the second position. Therefore, the cropping parameters may define a second cropped area 408 that is adjusted to compensate for the rotation of the vehicle mirror 204, as shown in FIG. 4B. The cropping parameters may additionally or alternatively indicate an area of the total camera view area 402 that correspond to the direction, angle, and tilt of the reflective surface 206 such that a user looking in the vehicle mirror 204 would see approximately the same image as depicted by the moveable camera 202.

The cropping parameters may include the position and the orientation of the moveable camera 202. For example, the position of the moveable camera 202 is located away from the rotational center of the reflective surface 206. The cropping parameters may therefore include the separation distance measured from the rotational center of the moveable camera 202 to the rotational center of the vehicle mirror 204. The position and the orientation of the moveable camera 202 may also be calculated from the first component and the second component, including for example, the first voltage signal and the second voltage signal mathematically. In another embodiment, the first component and the second component can be compared to a cropped view area table. The cropped view area table may include cropping parameters given a specified first component and a specified second component. In some embodiments, the cropped view area table may be stored locally at the VCD 102, for example, at the memory 106, or remotely and accessed by the crop module 118 via the network 140.

Furthermore, the shape of the reflective surface 206 may affect the cropping parameters. The shape of the reflective surface 206 may be flat, convex, or a combination thereof. In some embodiments, the shape of the reflective surface 206 may be based on the manufacturer of the host vehicle 200. The shape of the reflective surface 206 may also be included on the cropped view area table.

At block 312, the method 300 includes generating an adjusted cropped image by cropping the raw image based on the cropping parameters. Generating the adjusted cropped image may include cropping the total camera view area 402 based on the cropping parameters to the second cropped area 408. Therefore, the total camera view area 402 may have been cropped to include the first cropped area 404 based on the first position, but as the moveable camera moves, the cropping parameters cause the total camera view area 402 to be cropped in a different manner to generate the second cropped area 408 to account for the movement. In this manner, the complex motion of the reflective surface 206 can be compensated for with respect to the moveable camera 202.

At block 314, the method 300 includes displaying the adjusted cropped image on the display 132. In some embodiments the cropping parameters are based on a display area of the display 132. For example, suppose that the total camera view area 402 is a wide angle view, the cropping parameters may ensure that the adjusted cropped image is suitable for display on the display 132. Because the cropping parameters can be calculated by the first component sensor 136 and the second component sensor 138 as the reflective surface 206 are moving, the adjusted cropped image can be generated and displayed in real-time.

Figure 5:
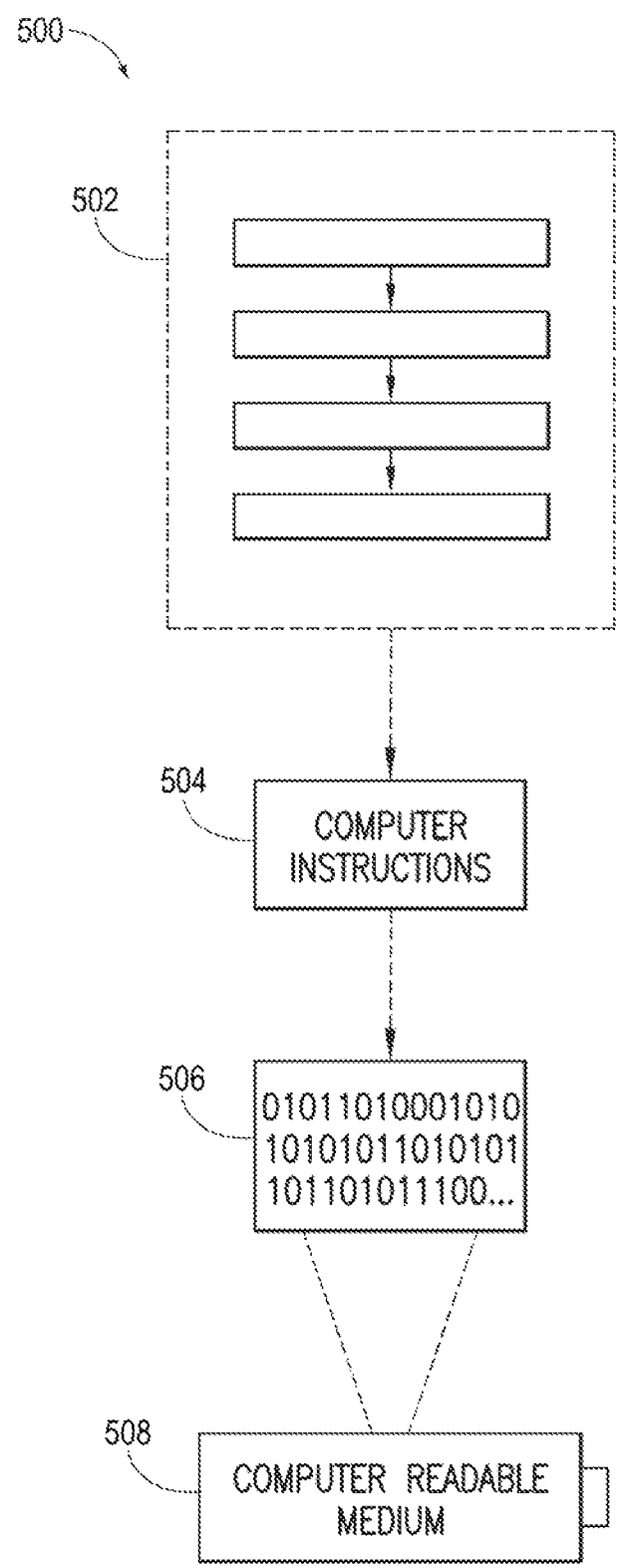
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 300 of FIG. 3. In another aspect, the processor-executable computer instructions 504 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for live signal adjustment of a moveable camera of a vehicle, the system comprising:
    a processor;
    an image module, implemented by the processor, configured to receive a raw image associated with the moveable camera associated with a vehicle mirror;
    a rotation module, implemented by the processor, configured to:
        receive a rotation input to change a position of a reflective surface of the vehicle mirror from a first position to a second position;
        determine a first component of the second position of the reflective surface based on a first input voltage associated with the first position compared to a first output voltage associated with the second position by a first component sensor; and
        determine a second component of the second position of the reflective surface based on a second input voltage associated with the first position compared to a second output voltage associated with the second position by a second component sensor;
    a crop module, implemented by the processor, configured to:
        determine cropping parameters based on a shape of the reflective surface, the first component, and the second component; and
        generate an adjusted cropped image by cropping the raw image based on the cropping parameters; and
    a display module, implemented by the processor, configured to display the adjusted cropped image on a display in response to the rotation input.

2. The system for live signal adjustment of the moveable camera of claim 1, wherein the moveable camera is separated from the vehicle mirror by a separation distance, and wherein the cropping parameters are further based on the separation distance.

3. The system for live signal adjustment of the moveable camera of claim 1, wherein cropping parameters define an area of an exterior environment of the vehicle to include in the adjusted cropped image.

4. The system for live signal adjustment of the moveable camera of claim 1, wherein the cropping parameters include a camera axis adjustment from a first camera axis associated with the first position to a second camera axis associated with the second position.

5. The system for live signal adjustment of the moveable camera of claim 1, wherein the first component sensor is a horizontal component sensor and the second component sensor a vertical component sensor.

6. The system for live signal adjustment of the moveable camera of claim 1, wherein the first component is a first voltage value and the second component is a second voltage value.

7. The system for live signal adjustment of the moveable camera of claim 1, wherein the raw image is a total camera view area of an exterior environment of the vehicle and the adjusted cropped image is a cropped view area smaller than the total camera view area.

8. A method for live signal adjustment of a moveable camera of a vehicle, the method comprising:
    receiving a raw image associated with the moveable camera associated with a vehicle mirror;
    receiving a rotation input to change a position of a reflective surface of the vehicle mirror from a first position to a second position;
    determining a first component of the second position of the reflective surface based on a first input voltage associated with the first position compared to a first output voltage associated with the second position by a first component sensor;
    determining a second component of the second position of the reflective surface based on a second input voltage associated with the first position compared to a second output voltage associated with the second position by a second component sensor;
    determining cropping parameters based on a shape of the reflective surface, the first component, and the second component;
    generating an adjusted cropped image by cropping the raw image based on the cropping parameters; and
    displaying the adjusted cropped image on a display in response to the rotation input.

9. The method for live signal adjustment of the moveable camera of claim 8, wherein the moveable camera is separated from the vehicle mirror by a separation distance, and wherein the cropping parameters are further based on the separation distance.

10. The method for live signal adjustment of the moveable camera of claim 8, wherein cropping parameters define an area of an exterior environment of the vehicle to include in the adjusted cropped image.

11. The method for live signal adjustment of the moveable camera of claim 8, wherein the cropping parameters include a camera axis adjustment from a first camera axis associated with the first position to a second camera axis associated with the second position.

12. The method for live signal adjustment of the moveable camera of claim 8, wherein the first component sensor is a horizontal component sensor and the second component sensor a vertical component sensor.

13. The method for live signal adjustment of the moveable camera of claim 8, wherein the first component is a first voltage value and the second component is a second voltage value.

14. The method for live signal adjustment of the moveable camera of claim 8, wherein the raw image is a total camera view area of an exterior environment of the vehicle and the adjusted cropped image is a cropped view area smaller than the total camera view area.

15. A non-transitory computer readable storage medium storing instructions that when executed by a computer having a processor to perform a method for live signal adjustment of a moveable camera of a vehicle, the method comprising:
- receiving a raw image associated with the moveable camera associated with a vehicle mirror;
- receiving a rotation input to change a position of a reflective surface of the vehicle mirror from a first position to a second position;
- determining a first component of the second position of the reflective surface based on a first input voltage associated with the first position compared to a first output voltage associated with the second position by a first component sensor;
- determining a second component of the second position of the reflective surface based on a second input voltage associated with the first position compared to a second output voltage associated with the second position by a second component sensor;
- determining cropping parameters based on a shape of the reflective surface, the first component, and the second component;
- generating an adjusted cropped image by cropping the raw image based on the cropping parameters; and
- displaying the adjusted cropped image on a display in response to the rotation input.

16. The non-transitory computer readable storage medium of claim 15, wherein the moveable camera is separated from the vehicle mirror by a separation distance, and wherein the cropping parameters are further based on the separation distance.

17. The non-transitory computer readable storage medium of claim 15, wherein cropping parameters define an area of an exterior environment of the vehicle to include in the adjusted cropped image.

18. The non-transitory computer readable storage medium of claim 15, wherein the cropping parameters include a camera axis adjustment from a first camera axis associated with the first position to a second camera axis associated with the second position.

19. The non-transitory computer readable storage medium of claim 15, wherein the first component sensor is a horizontal component sensor and the second component sensor a vertical component sensor.

20. The non-transitory computer readable storage medium of claim 15, wherein the first component is a first voltage value and the second component is a second voltage value.

* * * * *